United States Patent [19]

Chapman et al.

[11] Patent Number: 4,711,666

[45] Date of Patent: Dec. 8, 1987

[54] OXIDATION PREVENTION COATING FOR GRAPHITE

[75] Inventors: Lloyd R. Chapman, Anderson County; Cressie E. Holcombe, Jr., Knox County, both of Tenn.

[73] Assignee: ZYP Coatings, Inc., Oak Ridge, Tenn.

[21] Appl. No.: 9,716

[22] Filed: Feb. 2, 1987

[51] Int. Cl.$^4$ .................. C09K 15/02; C09K 15/32
[52] U.S. Cl. .................. 106/14.12; 252/506; 252/508; 252/516
[58] Field of Search .............. 106/14.12, 1.12, 308 Q, 106/38.3, 38.22, 38.35, 287.34

[56] References Cited

U.S. PATENT DOCUMENTS

| | | | |
|---|---|---|---|
| 2,927,043 | 3/1960 | Stetson | 106/1.12 |
| 2,995,453 | 8/1961 | Noble et al. | 106/38.27 |
| 3,348,929 | 10/1967 | Valtschev et al. | 106/1.12 |
| 3,510,347 | 5/1970 | Strater | 106/14.12 |
| 3,960,592 | 6/1976 | Birchall et al. | 106/308 Q |
| 4,319,924 | 3/1982 | Collins, Jr. et al. | 106/14.12 |

FOREIGN PATENT DOCUMENTS 1435988 5/1976 United Kingdom .............. 106/38.3

Primary Examiner—Paul Lieberman
Assistant Examiner—Helene Kirschner
Attorney, Agent, or Firm—Pitts and Brittian

[57] ABSTRACT

An oxidation prevention coating for graphite up to at least 1000 degrees Centigrade. Both a non-conductive and a conductive coating are described for use in coating graphite crucibles, graphite electrodes, and the like. All of the compositions utilize a binder/suspension liquid phase in an amount from about 40 to about 55 wt % of the total paintable mixture. This binder/suspension liquid phase is formed by intimately mixing colloidal silica solution, mono-aluminum phosphate solution and ethyl alcohol. The non-conducting embodiment of the invention is produced by mixing finely divided boric acid and silicon carbide with the binder/suspension liquid phase. The preferred conductive coating substitutes a mixed TiC-SiC for the SiC of the non-conductive embodiment. The resultant material is very stable (i.e., does not settle), is paintable upon the graphite, and is easily dried at or near room temperature. A few thin coats, with drying between applications, totaling only about 0.15 to about 0.23 mm prevents detrimental oxidation through several cycles to at least 1000 degrees C.

15 Claims, 1 Drawing Figure

OXIDATION PREVENTION COATING FOR GRAPHITE

DESCRIPTION

1. Technical Field

This invention relates generally to the prevention of graphite oxidation at elevated temperatures, and more particularly to a paintable coating that when dry substantially prevents such oxidation up to at least 1000 degrees C.

2. Background Art

Graphite is utilized in many forms in the chemical and metallurgical industries for high temperature applications. Typical of these applications are for crucibles used in the melting of many metals, for electrodes in electro-arc furnaces, etc. Graphite crucibles or molds, for example, exhibit good mechanical strength and excellent thermal stability under the temperature conditions encountered. These same attributes are important in the electrodes.

A major deficiency to the use of graphite and other carbonaceous articles is that they rapidly oxidize and erode at temperatures above about 500 degrees C. since the carbon reacts with oxygen to form CO and/or $CO_2$. Thus, in the case of the crucibles, they become thinned and periodically must be replaced. Graphite rods, when used as electrodes, "pencil down" at the end and continue to erode. While some consumption is expected in the melting process, the oxidation loss accelerates the erosion/corrosion and reduces the current-carrying capacity. Accordingly, the electrode must be progessively advanced into the melt and then additional lengths must be added.

A number of coating materials have been developed to reduce the problem of oxidation. Typical of these coating are described in U.S. Pat. Nos. 2,995,453, issued to R. D. Noble, et al., on Aug. 8, 1961; 4,559,270, issued to R. V. Sara on Dec. 17, 1985; 4,418,097, issued to M. S. Misra on Nov. 29, 1983; 3,140,193, issued to J. S. Kane on July 7, 1964; 4,301,387, issued to J. Schiffarth, et al., on Nov. 17, 1981; 3,348,929, issued to A. J. Valtschev, et al., on Oct. 24, 1967; and 2,749,254, issued to J. A. Slyh, et al., on June 5, 1956. Many of these coatings must be applied under conditions of elevated temperature under an inert atmosphere in order to achieve a highly adherent coating. These processes, due to the extremes of conditions, can result in gaps of the coating leaving those areas to be subjected to oxidation. In the '270 patent, for example, heating to at least 1100 degrees C. is required; in '254, a temperature of about 2200 degrees C. is required. The coating of '929 requires "metallization", and in '387 the coating is applied in the form of pre-formed sheet material.

The coatings of the prior art contain various forms of silicon compounds and alumina compounds: silicon carbide, sodium silicate, mullite being typical. Others have varying proportions of boron, phosphates, etc., including many of the refractory oxides. Although some of these compounds are inexpensive, others are not. Furthermore, many of the coatings derived from silicates tend to be hydroscopic (collect moisture from the atmosphere on the surface). This excessive moisture can be detrimental when the coated object comes in contact with molten metal, for example. In addition, these coatings are generally so electrically insulative that they cannot be used on electrodes proximate the current clamps.

Accordingly, it is one object of the present invention to provide a material for effecting a corrosion resistant coating on graphite and similar carbonaceous bodies.

It is another object to provide a material that forms an effective protection against oxidation of graphite and like materials that does not require "conditioning" at elevated temperatures.

Another object is to provide a "paint-like" material that can be applied to graphite and like materials and then dried at near room temperature to achieve an oxidation prevention coating.

Still another object is to provide a method for producing a "paint-like" material having long shelf life that can be applied to graphite and the like materials and dried at near room temperature to produce an oxidation prevention coating.

A further object is to provide an inexpensive oxidation prevention coating for graphite and like materials that can be formulated to be either electrically conductive or non-conductive.

These and other objects of the present invention will become apparent upon a consideration of the following drawing and a complete description which follow.

DISCLOSURE OF THE INVENTION

In accordance with the present invention, there is provided a coating for protecting graphite and like substances from oxidation up to at least 1000 degrees C. Also, a method for producing the material for achieving that coating forms an essential part of the present invention. A paintable mixture, which upon drying forms the coating, is produced by thoroughly mixing colloidal silica solution (35–65 vol. %) and mono-aluminum phosphate solution followed by the addition of about 0.5–45% by volume (based on combined total of other reagents) of ethyl alcohol. This mixture is aged or further mixed to produce a stable thick liquid phase. To this liquid phase is added up to about 17.6 wt % boric acid powder and about 45–50 wt % silicon carbide (or similar) powder to produce a glass-type material suitable for painting on the graphite in one or more thin layers to produce the oxidation resistant coating. A portion of the SiC can be replaced with, for example, TiC to produce an electrically conductive coating up to about 600 degrees C. The final preferred composition has the following approximate molar percentages of the glass-forming species: $B_2O_3$, 9.7%; $SiO_2$, 51.8%; $Al_2O_3$, 9.6; and $P_2O_5$, 29.0%.

DESCRIPTION OF THE PREFERRED EMBODIMENT

Figure 1:
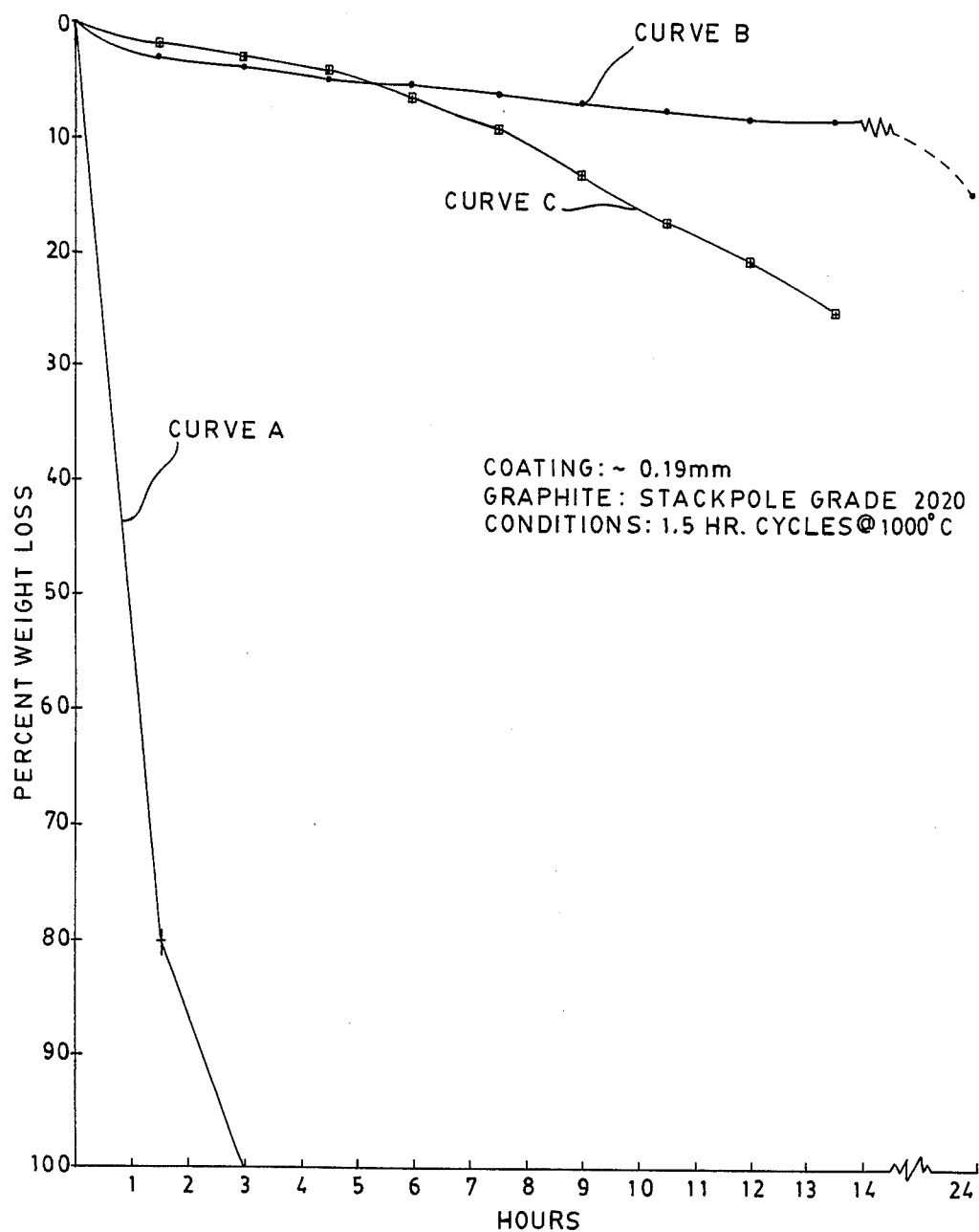
FIG. 1 is a plot of typical weight loss of graphite when repetitively cycled to about 1000 degrees C. Curve A depicts the results observed for unprotected graphite, Curve B depicts the results observed for graphite protected with a non-conductive coating of the present invention, and Curve C depicts the results with a conductive coating of the present invention.

The present invention is based upon the discovery that an adherent impervious glass-like coating can be achieved on graphite at near room temperature, with that coating providing substantial protection against oxidation of the graphite up to at least 1000 degrees C. The coating is based upon a binder/suspension liquid phase formed from colloidal silica solution, mono-aluminum phosphate solution and ethyl alcohol. To this is added powdered boric acid and silicon/titanium carbide to form the composition of the glass-like coating produced by drying at near room temperature. As discussed hereinafter, alternate materials are potentially useful in the present invention.

A preferred composition for the liquid phase of oxidation resistant coating is prepared by intimately mixing substantially equal liquid volumes of colloidal silica solution and mono-aluminum phosphate solution at room temperature. A suitable colloidal silica solution is commercially available Nyacol 830 as obtained from Nyacol Products, Ashland, Mass. This consists of 8 millimicron silica spheres in dispersion containing 0.45% $Na_2O$, has a pH=10.7, and is a clear watery liquid having a density of 1.27 $g/cm^3$. A commercially available mono-aluminum phosphate solution is typically obtained from Albright & Wilson, Inc., Richmond, Va. Its formula is $Al(H_2PO_4)_3$, with 8.0% $Al_2O_3$ and 33.7% $P_2O_5$, the pH is 1.0 and it is a clear syrupy liquid having a density of 1.74 $g/cm^3$. Other sources of similar colloidal silica and mono-aluminum phosphate solutions will be known by those versed in the art. During continued stirring, ethyl alcohol ($C_2H_5OH$:95% ethanol, 0.79 $g/cm^3$) is added in an amount approximately 11% by volume of the combined total of the other constituents. This yields a sticky and creamy precipitate which, upon standing with occasional stirring while covered, produces a moderately thick milky "liquid" phase that is very uniform in consistency, having a density of about 1.33 $g/cm^3$, and exhibiting a very good shelf life. This liquid is believed to be a mixed aluminum phosphate-silica agglomerate/aggregate dispersed in a phosphoric acid-alcohol mix. The preferred liquid-phase material has the following weight and mol percentages:

TABLE I

| Item | wt % | mol % Excluding $H_2O$ | mol % Including $H_2O$ |
|---|---|---|---|
| $SiO_2$ | 12.96 | 42.3 | 5.6 |
| $Al_2O_3$ | 4.06 | 7.8 | 1.0 |
| $P_2O_5$ | 17.12 | 23.7 | 3.2 |
| $Na_2O$ | 0.19 | 0.6 | 0.1 |
| $C_2H_5OH$ | 6.02 | 25.6 | 3.4 |
| $H_2O$ | 59.65 | | 86.6 |

In order to produce the non-conducting embodiment of the present invention, boric acid ($H_3BO_3$) and silicon carbide powders (greater than 99% purity, less than 44 micrometers) are added to the above-described liquid phase. The proportions are, in the preferred embodiment, 50% by weight liquid phase, 2.5 wt % $H_3BO_3$ and 47.5 wt % SiC. This results in a "paint" having the following composition of its binder phase (i.e., excluding the SiC):

TABLE II

| Item | mol % |
|---|---|
| $B_2O_3$ | 9.7 |
| $SiO_2$ | 51.8 |
| $Al_2O_3$ | 9.6 |
| $P_2O_5$ | 29.0 |

While the mechanism of forming a protective coating with this paint is not fully understood, it is believed that the mono-aluminum phosphate phase at somewhat elevated temperature forms AlPO and the initial molar ratio of $Al_2O_3$:$P_2O_5$ of $0.33^4$ provides excess $P_2O_5$ such that the phases $BPO_4$, $AlPO_4$, $2SiO_2P_2O_5$ and $SiO_2$ exist, and the $BPO_4$, $AlPO_4$ and $SiO_2$ form a solid solution. With a knowledge of the melting points of the $2SiO_2P_2O_5$-$SiO_2$ eutectic and the weighted average of estimated melting point of the solid solution, the estimated melting point of the resultant glass-like coating is at least 1300 degrees C.

A conductive protective coating is produced in a similar manner. The above-described liquid phase, which is a binder/suspension agent, is prepared using colloidal silica solution, mono-aluminum phosphate solution and ethyl alcohol. In a preferred embodiment to this liquid phase (as 42.0% by weight) is added 2.1 wt % $H_3BO_3$ powder, 45.9 wt % TiC powder, and 10.0 wt % SiC powder. As above, the powders were greater than 99% pure and had a particle size less than about 44 micrometers. This coating material was demonstrated to be conductive up to about 600 degrees C. at which time the TiC oxidizes. For graphite electrodes this conversion from conductive to non-conductive is no problem as the region on the electrode where current clamps are applied is maintained below that temperature. The non-conductive form at higher temperatures is not detrimental in the melt.

The coatings of the present invention were tested for effectiveness by applying the same to rectangular parallelepipeds of graphite (various sources) having dimensions of 1–2 cm×1–2 cm×2–3 cm. The coatings were generally applied in three coats. Drying of each coat was utilized prior to the application of the next coat. Edges were coated one additional time to prevent failure due to possible edge flaws in previous coats. The total thickness of the dried coating was about 0.15 to 0.23 mm on each test unit. Each sample was subjected to possible oxidation by cyclic heating in air from 20 degrees C. to 1000 degrees C., holding at that temperature for 1.5 hours, and then furnace-cooling back to 20 degrees. This cycling was repeated with the weight loss (in percent) determined after each cycle. The results were compared with those for unprotected graphite.

Typical results are illustrated in the single FIG. 1. Curve A depicts the weight loss of unprotected graphite (Stackpole 2020). After one cycle there was a 80% weight loss, and after two cycles the sample was completely oxidized.

Curve B of FIG. 1 represents typical data for the samples protected with the preferred non-conductive coating. After ten cycles at 1000 degrees C., the sample lost only about 10% by weight. The results for the preferred conductive coating are shown in Curve C illustrating that the sample lost less than 10% with five cycles in this test. Note that the electrically conductive coating oxidizes above 600 degrees C. on the first cycle and is thus non-conductive thereafter. In all the tests used for Curves A–C, the graphite was Stackpole Grade 2020. Tests with other grades of graphite (e.g., Union Carbide Grades ATJ, and CS and Poco Carbon Grade AXF-5Q) gave similar results relative to the degree of protection afforded by these coatings.

The coefficient of thermal expansion (CTE) of graphite is variable, since graphite is hexagonal, but is generally about $4-5\times10^{-6}$/degrees C. Some grades of graphite have a CTE as high as $8\times10^{-6}$/degrees C. Ideally it is thought that the protective coating must "breathe" so as to not crack during expansion or contraction. Silicon carbide has two forms: alpha (hexagonal) with a CTE of about $4-5.5\times10^{-6}$/degrees C.; and beta (cubic) with a CTE of about $3.9 \times 10^{-6}$/degrees C. A study was performed to determine the effect, if any, of the type of SiC upon the performance of the protective coatings. In general, all of the coatings using alpha SiC allowed no more than 10% wt loss in five cycles. Tested were Norton Co. "600 Grit", and Ferro Corp. "600 Grit". Superior Graphite Co. Type HSC-95FCL beta SiC also produced a coating giving less than 10% wt loss in five cycles; Superior Graphite Co, Type 95 K/MMC beta SiC produced a coating that lost less than 10% over eleven cycles.

An investigation was made to determine the necessity of the three-component binder/suspension agent. When ethyl alcohol was added to a colloidal silica solution alone, the liquid remained clear, no precipitate formed and thus was determined to be unacceptable as a binder. When alcohol was added to the mono-aluminum phosphate solution, a precipitate formed but could not be dispersed. This would produce a binder but has no suspension properties. Furthermore, if used as a paint, such material would be very hydroscopic. Any attempt at drying results in a sticky gum that balloons/blisters when the coating is fully dried.

When colloidal silica solution and mono-aluminum phosphate are mixed, bloating of the coating was reduced. This mixture is similar to some of the coatings of the prior art. However, the coating is very hydroscopic. The resultant material has no suspending ability for other additives to effect a oxidation prevention coating for graphite.

Other investigations were made to study the effect of the range of concentrations of the constituents of the present invention. With respect to boric acid, a preferred amount is about 2.5 wt % although reasonable protection occurred over a range of 0 to 17.6% (other constituents adjusted accordingly). While the preferred liquid phase is produced from equal volumetric quantities of the colloidal silica solution and the mono-aluminum phosphate solution, with a preferred addition of about 9 to 13 vol. % ethyl alcohol based upon the total volume of the other constituents, other ratios can be used. A usable range of these principal constituents is 35 to 65 vol. % of the colloidal silica solution, 35 to 65 vol. % of the mono-aluminum phosphate solution, and 0.5 to 45% of the alcohol. Thus, the colloidal silica solution can be about 0.54 to about 1.86 times the amount of the mono-aluminum phosphate solution. If the colloidal silica solution content exceeds 65% of the mix, the desirable uniform, moderately thick liquid does not result—the mix has large coagulated regions and no suspendability. If the mono-aluminum phosphate solution content exceeds about 65% of the mix, the liquid phase is gummy, hygroscopic and will not dry. Ethyl alcohol additive levels below 0.5% do not adequately produce the preferred liquid with its suspension characteristics; and above 45% of ethyl alcohol, the suspension characteristics are lost from excessive dilution of the liquid phase.

The terms colloidal, agglomerate, aggregate, particle, etc., as used herein are meant those conditions as expressed in the definitions found in "The Condensed Chemical Dictionary", 10th Ed., Van Nostrand Reinhold Company (1981) [Library of Congress Catalogue Card: 80-29636].

From the foregoing it will be apparent to one versed in the art that a useful composition has been described for the prevention of graphite oxidation to temperature up to at least 1000 degrees C. Both non-conducting and conducting coatings have been described. Although test data is limited primarily to a preferred embodiment, there is no intent to limit the composition to that of the preferred embodiment. Rather, the invention is to be limited only by the appended claims and their equivalents when taken together with the complete disclosure of the invention.

We claim:

1. A binder/suspension liquid for use in preparing a protective coating to substantially prevent oxidation of graphitic materials up to at least 1000 degrees Centegrade, which comprises:
    a substantially pure colloidal silica solution of a selected volume;
    a substantially pure mono-aluminum phosphate solution of a selected volume, said selected volume of said mono-aluminum phosphate solution being from about 0.54 to about 1.86 times said selected volume of said colloidal silica solution, said colloidal silica solution and said mono-aluminum phosphate solution being intimately mixed; and
    substantially pure ethyl alcohol of a selected volume, said selected volume of said ethyl alcohol being from about 0.05 to 0.45 times the combined selected volumes of said colloidal silica solution and said mono-aluminum phosphate solution, said ethyl alcohol intimately mixed with said mixed colloidal silica solution and mono-aluminum phosphate solution.

2. The binder/suspension liquid of claim 1 wherein said colloidal silica solution and said mono-aluminum phosphate solution are present in equal volumes, and said ethyl alcohol is about 9-13% by volume of the combined volumes of said colloidal silica solution and said mono-aluminum phosphate solution.

3. A paintable coating material for applying to graphite and like graphitic materials to obtain an oxidation resistant coating to said materials when dried, which comprises:
    a liquid phase of an intimate mixture of selected volumes of substantially pure colloidal silica solution, substantially pure mono-aluminum phosphate solutions and substantially pure ethyl alcohol, said mono-aluminum phosphate solution having a selected volume of about 0.54 to 1.86 times a selected volume of said colloidal silica solution, and said ethyl alcohol having a selected volume of about 0.05 to 0.45 times the combined volumes of said colloidal silica solution and said mono-aluminum phosphate solution, said liquid phase being from about 40 to 55 wt % of said paintable coating material; and
    about 45 to about 65 wt % of a substantially pure carbide powder selected from the group consisting of silicon carbide and silicon-titanium carbide.

4. The paintable coating material of claim 3 further comprising up to about 17.6 wt % of substantially pure boric acid intimately mixed with said liquid phase.

5. The paintable coating material of claim 4 wherein said carbide is beta silicon carbide having a particle size of less than about 44 micrometers.

6. The paintable coating of claim 4 wherein said carbide is alpha silicon carbide having a particle size of less than about 44 micrometers.

7. The paintable coating material of claim 4 wherein said carbide is about 40-50 wt % titanium carbide and about 5-15 wt % silicon carbide each having particle sizes of less than about 44 micrometers.

8. The paintable coating material of claim 4 wherein:
said liquid phase is formed of equal volumes of said colloidal silica solution and said mono-aluminum phosphate solution, and about 9 to 13% ethyl alcohol by volume of said combined volume of said colloidal silica solution and said mono-aluminum phosphate solution, said liquid phase being about 50% by weight of said material;
said boric acid is about 2.5 wt % of said material; and
said carbide powder is about 47.5 wt % of said material.

9. The paintable coating material of claim 8 wherein said carbide powder is silicon carbide with a particle size of less than about 44 micrometers.

10. The paintable coating material of claim 4 wherein:
said liquid phase is formed of equal volumes of said colloidal silica solution and said mono-aluminum phosphate solution, and about 9 to 13% said ethyl alcohol by volume of said combined volume of said colloidal silica solution and said mono-aluminum phosphate solution, said liquid phase being about 42.0% by weight of said material;
said boric acid is about 2.1 wt % of said material; and
said carbide powder is about 45.9 wt % TiC powder and about 10.0 wt % SiC powder, said TiC and SiC powder having a particle size of less than about 44 micrometers.

11. A method of preparing a coating for application to a graphitic structure to prevent oxidation at temperatures up to at least 1000 degrees C., which comprises:
intimately mixing a selected volume of a substantially pure colloidal silica solution with a selected volume of a substantially pure mono-aluminum phosphate solution, said selected volume of said mono-aluminum phosphate solution being about 0.54 to 1.86 times said selected volume of said colloidal silica solution;
intimately mixing a selected volume of substantially pure ethyl alcohol with said mixture of said colloidal silica solution and said mono-aluminum phosphate solution, said selected volume of said ethyl alcohol being about 0.05 to 0.45 times the combined volumes of said colloidal silica solution and said mono-aluminum phosphate solution, said resulting mixture forming a binder/suspension liquid phase, said binder/suspension liquid phase being about 40 to about 55 wt % of said coating;
intimately mixing a selected weight of substantially pure boric acid powder with said binder/suspension liquid phase, said selected weight of said boric acid being up to about 17.6 wt % based upon total weight of said coating; and
intimately mixing with said binder/suspension liquid phase a selected quantity of a finely divided, substantially pure, carbide selected from the group consisting of silicon carbide and silicon-titanium carbide, said selected quantity of said carbide being about 45 to 65 wt % based upon total weight of said coating.

12. The method of claim 11 wherein:
said selected volumes of said colloidal silica solution and said mono-aluminum phosphate solution are substantially equal;
said selected volume of said ethyl alcohol is about 9 to 13% of the combined volume of said colloidal silica solution and said mono-aluminum phosphate;
said binder/suspension liquid phase is about 50 wt % of said coating;
said boric acid is about 2.5 wt % of said coating; and
said carbide is silicon carbide having a particle size of less than about 44 micrometers and being about 47.5 wt % of said coating.

13. The method of claim 11 wherein:
said selected volumes of said colloidal silica solution and said mono-aluminum phosphate solution are substantially equal;
said selected volume of said ethyl alcohol is about 9 to 13% of the combined volume of said colloidal silica solution and said mono-aluminum phosphate;
said binder/suspension liquid phase is about 42 wt % of said coating;
said boric acid is about 2.1 wt % of said coating; and
said carbide is about 45.9 wt % TiC and about 10.0 wt % SiC having particle sizes, respectively, of less than about 44 micrometers.

14. The method of claim 12 wherein said silicon carbide is predominantly alpha silicon carbide.

15. The method of claim 12 wherein said silicon carbide is predominantly beta silicon carbide.

* * * * *